United States Patent
Consoli (10) Patent No.: US 9,404,937 B2
(45) Date of Patent: Aug. 2, 2016

(54) PENDULAR ACCELEROMETER FOR DETECTING THRESHOLD OSCILLATION VALUES

(75) Inventor: Luciano Consoli, Paris (FR)

(73) Assignee: SIEMENS S.A.S., St. Denis (FR)

( * ) Notice: Subject to any disclaimer, the term of this patent is extended or adjusted under 35 U.S.C. 154(b) by 283 days.

(21) Appl. No.: 14/128,848

(22) PCT Filed: Jun. 19, 2012

(86) PCT No.: PCT/EP2012/061743
§ 371 (c)(1),
(2), (4) Date: Dec. 23, 2013

(87) PCT Pub. No.: WO2012/175515
PCT Pub. Date: Dec. 27, 2012

(65) Prior Publication Data
US 2014/0123756 A1 May 8, 2014

(30) Foreign Application Priority Data

Jun. 21, 2011 (EP) ..................................... 11290282

(51) Int. Cl.
*G01P 15/03* (2006.01)
*G01P 15/08* (2006.01)
*G01P 15/093* (2006.01)
*B61L 25/02* (2006.01)

(52) U.S. Cl.
CPC ............. *G01P 15/036* (2013.01); *B61L 25/021* (2013.01); *B61L 25/023* (2013.01); *G01P 15/032* (2013.01); *G01P 15/0802* (2013.01); *G01P 15/0891* (2013.01); *G01P 15/093* (2013.01)

(58) Field of Classification Search
CPC . G01P 15/032; G01P 15/036; G01P 15/0802; G01P 15/093; G01P 15/0891; B61L 25/023; B61L 25/021; B61H 7/083; G05B 2219/37292
USPC ................... 73/514.36, 514.37, 1.39, 514.14, 73/514.26; 340/669; 33/391; 200/61.51; 250/231.1
See application file for complete search history.

(56) References Cited

U.S. PATENT DOCUMENTS

| 3,147,391 A | 9/1964 | Darrel et al. |
| 3,783,601 A * | 1/1974 | Curran ................... G04C 3/061 200/61.51 |
| 3,795,780 A * | 3/1974 | Lawrie ................. H01H 35/147 200/61.45 M |
| 3,908,782 A | 9/1975 | Lang et al. |
| 3,934,950 A * | 1/1976 | Kuhlmann .............. F16C 17/08 310/90.5 |

(Continued)

FOREIGN PATENT DOCUMENTS

| CN | 201464493 U | 5/2010 |
| DE | 19923412 A1 | 12/2000 |

(Continued)

*Primary Examiner* — Peter Macchiarolo
*Assistant Examiner* — David L Singer
(74) *Attorney, Agent, or Firm* — Laurence Greenberg; Werner Stemer; Ralph Locher (57) ABSTRACT

A device for measuring the acceleration of a moving body includes a pendulum capable of oscillating about an instantaneous center of rotation and a detection system capable of detecting an oscillation of the pendulum that is likely to result from the acceleration. The pendulum has a geometric configuration enabling it to interact with the detection system. The geometric configuration is such that the detection system only indicates an oscillation of the pendulum that exceeds a threshold oscillation value.

14 Claims, 6 Drawing Sheets

(56) References Cited

U.S. PATENT DOCUMENTS

| | | | | |
|---|---|---|---|---|
| 4,030,756 A | * | 6/1977 | Eden | B60T 13/74 180/14.1 |
| 4,159,577 A | | 7/1979 | Bergkvist | |
| 4,496,808 A | * | 1/1985 | Alexander | H01H 35/142 200/61.45 R |
| 4,571,844 A | * | 2/1986 | Komasaku | G01C 9/06 33/366.23 |
| 4,700,479 A | * | 10/1987 | Saito | G01C 9/14 33/366.23 |
| 4,726,627 A | * | 2/1988 | Frait | B60T 8/266 188/181 A |
| 4,811,492 A | * | 3/1989 | Kakuta | G01C 9/12 33/366.25 |
| 4,849,655 A | | 7/1989 | Bennett | |
| 4,900,925 A | * | 2/1990 | Andres | G01P 15/0891 250/231.1 |
| 5,134,883 A | | 8/1992 | Shannon | |
| 5,495,762 A | * | 3/1996 | Tamura | G01P 15/093 73/514.37 |
| 5,659,137 A | | 8/1997 | Popp | |
| 6,493,952 B1 | * | 12/2002 | Kousek | G01C 15/004 33/286 |

FOREIGN PATENT DOCUMENTS

| | | | | |
|---|---|---|---|---|
| GB | 615139 A | * | 1/1949 | G04B 17/30 |
| JP | 56008557 A | * | 1/1981 | |

* cited by examiner

PENDULAR ACCELEROMETER FOR DETECTING THRESHOLD OSCILLATION VALUES

BACKGROUND OF THE INVENTION

Field of the Invention

The present invention relates to a device for measuring the acceleration of a moving body, including a pendulum capable of oscillating about an instantaneous center of rotation and a detection system capable of detecting an oscillation of the pendulum likely to result from the acceleration.

In particular, the present invention relates to the field of vehicles, in particular guided vehicles, requiring backed-up measurement of their acceleration, such as for example guided vehicles in the field of railways. "Guided vehicle" refers to means of public transport such as buses, trolleybuses, trams, metros, trains or train units, etc., for which the safety aspect is very important. Generally, the present invention applies to any moving body (i.e. to any body which moves or is moved, such as for example an automobile) obliged to observe at least one acceleration safety criterion. This safety criterion is in particular capable of making said moving body safe during an acceleration, for example emergency braking. By acceleration, the present invention refers to positive accelerations (increase in velocity as a function of time) and negative accelerations or decelerations (decrease in velocity as a function of time) of the moving body.

For a number of moving bodies, in particular moving bodies providing for the transportation of passengers such as for example manual or automatic metros, running on iron or tires, it is necessary to determine whether the acceleration, positive or negative, undergone by the moving body is greater than a predefined threshold acceleration value or not. For example, in order to ensure the safety of a guided vehicle such as a metro, the acceleration of the latter during emergency braking must compulsorily adhere simultaneously to several safety criteria, including in particular:
- a minimum deceleration value, taken as an assumption for calculations of safe stopping distance (typically 1.8 m/s$^2$)
- a maximum deceleration value, beyond which standing passengers on board the vehicle risk falling (typically: −0.32 g, i.e. a deceleration of 3.2 m/s$^2$ according to standard ASCE 21, or 3.5 m/s$^2$ according to standard EN 13452).

As a general rule, when an emergency braking order is issued, an emergency brake solenoid valve opens, said opening allowing a reduction in a hydraulic or pneumatic pressure giving rise to an activation of the emergency brake and an increase in the deceleration of the moving body (the velocity of said moving body decreases as a function of time). Then, when the deceleration reaches or exceeds a predetermined threshold value, another solenoid valve, known as an emergency brake limitation solenoid valve, closes, said closure giving rise to constant maintenance of said pressure and perceptibly constant maintenance of the deceleration. Finally, when the vehicle stops, the deceleration is cancelled, the emergency brake limitation solenoid valve opens and the pressure falls to zero (complete release).

The failure to adhere to the first safety criterion (minimum deceleration value) is an event of severity I considered "catastrophic" in the sense of standard EN-50126 and requiring an SILO control logic. The failure to adhere to the second safety criterion (maximum deceleration value) is an event of severity II considered "critical" or III considered "marginal" in the sense of standard EN-50126, then requiring an SIL2 control logic. Another safety criterion is rapid variation of the deceleration of said moving body during emergency braking. In fact, a jerk of the order of 3 to 6 m/s$^3$ should be observed during emergency braking in order to ensure the safety of said moving body.

This jerk involves a method and a device for measuring the variation in velocity of the moving body as a function of time characterized by a short response time. Thus, the exceeding of a level of deceleration must be detected before the deceleration of the moving body reaches this threshold, so as to give the braking system time to react.

Numerous methods and devices for measuring the acceleration of a moving body are known to a person skilled in the art. Some accelerometers use for example a tube filled with mercury to measure the deceleration of the moving body. Thus, GB 2 211 942 A describes a device capable of measuring an acceleration on the basis of an electrical or optical measurement of a movement of a fluid, in particular mercury, contained inside a sealed tube in the shape of a "U" or "O". Unfortunately, said tube is fragile, easily damaged and thus likely to release said fluid, which might in particular be found to be harmful when mercury is involved. Furthermore, such accelerometers can generally only indicate the variation in velocity of the moving body as a function of time in a single direction of movement of said moving body. Each direction of movement of the moving body must therefore be associated with its own device for measuring acceleration. In particular in the case of guided vehicles characterized by two directions of movement, respectively forward movement and backward movement, two accelerometers are necessary in order to cover the measurement of acceleration in said two directions of movement.

Another device for measuring acceleration is described in U.S. Pat. No. 4,849,655. This involves a device made up of two elements, a first fixed element and a second element having relative movement with respect to said first element. These two elements are for example respectively a magnetic field emitter and a Hall effect sensor. During acceleration, the relative movement between the two elements produces a variation in the magnetic field which is detected by the sensor. The latter then produces a signal correlated with the variation in velocity of the moving body. This signal is then processed electronically in order in particular to be used to control the braking of said moving body.

Other devices are in particular based on the detection and measurement of acceleration on the basis of a sensor which changes voltage as a function of its direction of rotation (U.S. Pat. No. 5,659,137), on an angular accelerator using mercury as inertial mass (U.S. Pat. No. 3,147,391), on measurement of the movement of a part of a pendulum immersed in a liquid (U.S. Pat. No. 5,134,883). Unfortunately, their operating principles are generally complex, requiring for example signal analysis, and also involving high production cost. Also, these devices are not reliable over a long period of operation, being subject to wear, in particular mechanical, of their component parts and of the parts interacting in the measurement of acceleration.

BRIEF SUMMARY OF THE INVENTION

An object of the present invention is to propose a device for measuring variation in the velocity of a moving body as a function of time which is simple, economically advantageous (in particular in order to allow for maintenance, apart from ongoing checks, through the simple replacement of said device), safe, reliable, and capable of rapidly establishing said measurement of said variation in velocity as a function of time (i.e. having a short response time, in particular of the order of 100 to 200 ms).

Another object of the present invention is in particular to provide for reliable determination of the exceeding of a predefined acceleration threshold value (tolerable limit value) undergone by the moving body, independently of signal processing intended to determine said exceeding.

With these objects, a device for measuring the acceleration of a moving body is provided, which includes a pendulum capable of oscillating about an instantaneous center of rotation and a detection system capable of detecting an oscillation of the pendulum likely to result from the acceleration. The pendulum has a geometric configuration enabling it to interact with the detection system. The geometric configuration is such that it only allows the detection system to indicate an oscillation of the pendulum exceeding a threshold oscillation value.

The present invention proposes a device for measuring the acceleration of a moving body, said measuring device being intended to be fitted to said moving body and including:

a pendulum capable of oscillating about an instantaneous center of rotation O (i.e. a point about which said pendulum, or in particular its center of gravity, is capable of oscillating at a given instant with respect to a frame of reference, for example said moving body, or a protective casing of said pendulum)

a detection system capable of detecting an oscillation of said pendulum likely to result from said acceleration said measuring device according to the invention being characterized in that:

the pendulum has a geometric configuration enabling it to interact with said detection system, said geometric configuration being such that it only allows said detection system to indicate an oscillation of said pendulum exceeding, or in particular breaching, a threshold oscillation value, or in other words, said geometric configuration allows the detection system to generate a detection signal capable only of indicating that said pendulum is undergoing an acceleration exceeding a threshold acceleration value.

The detection system according to the invention may in particular include a detector arranged perpendicular to a plane of oscillation of said pendulum and preferentially also perpendicular to an axis passing through the center of gravity of the pendulum at rest (said axis being for example aligned on the gravitational field) and the instantaneous center of rotation O.

Plane of oscillation refers in particular to the plane in which the center of gravity of said pendulum moves when said pendulum oscillates about said center of rotation O. Said detection system according to the invention may also include an emitter intended to interact with said detector. Said emitter and said detector are intended to interact with one another in order to generate a detection signal not requiring any processing in order to be interpreted by a braking system, since it is capable of indicating directly whether an oscillation of said pendulum exceeds said threshold oscillation value. For example, said emitter is a device generating a light beam and the detector is a photoelectric detection device, or said detection system is a capacitive or inductive proximity detector, including an emitter capable of emitting a magnetic or electrical field capable of interacting with an object included in the body of said pendulum, in particular a metallic or magnetic object, and a detector is capable of detecting a variation of said magnetic or respectively electrical field, in particular during an interaction of said object with said magnetic or respectively electrical field. Other emitter-detector pairs will be presented in more detail in the rest of the document.

Said geometric configuration according to the invention may in particular be defined as a function of the mass of the pendulum, the position of its center of gravity with respect to the instantaneous center of rotation, its plane of oscillation, a position of the detection system with respect to said pendulum, in order to guarantee that only an oscillation exceeding a threshold oscillation value can be detected by said detection system. Preferentially, said geometric configuration is such that said pendulum includes, at a position of said pendulum intended to be opposite said detection system (in particular, opposite said detector) when said oscillation is equal to said threshold oscillation value, an interface between two media, respectively a first medium and a second medium, only one of the two media being capable of interacting with said detection system in order to indicate said exceeding or breach of the threshold oscillation value. Said detection system is thus capable of indicating a passage of said first medium to said second medium and conversely, and thus any exceeding or breach of a threshold oscillation value, and thus of a threshold acceleration value corresponding to said threshold oscillation value.

Interface refers to the surface separating the two media, which may be solid, liquid or gaseous. Medium refers to a set of physical elements capable of constituting a body (solid, liquid, gaseous) capable of interacting or respectively not interacting with the detection system. For example, the first medium and the second medium may each be a solid body or the first medium may be a solid body, while the second medium is a gaseous body.

Preferentially, according to a particular embodiment, the first medium is made up of a non-metallic part of said pendulum and the second medium is made up of a metallic part capable of fulfilling the role of emitter. Otherwise, according to another particular embodiment, the first medium could be a solid material intended to form the body of said pendulum, and the second medium could be a gas included in or occupying (for example temporarily) a hollow in said pendulum, for example an aperture or a window made in the body of said pendulum. Advantageously, said detector is in particular capable of detecting a passage of said first medium to said second medium when said oscillation is greater than or equal to said threshold value, said passage being thus capable of directly or indirectly provoking signaling by said detector of an exceeding of a threshold oscillation value. Said detection signal capable of being generated by the detector is in particular characterized by two states, a first state which can be characterized by a first value of the detection signal and relating to non-exceeding of said threshold oscillation value, and a second state which can be characterized by a second value of the detection signal and relating to exceeding said threshold oscillation value. In this case, the braking system can in particular be directly activated as a function of the state of the detection signal (or, in other words, of the value of said detection signal) generated by the detector, free from any processing of said detection signal. Said signaling then corresponds simply to a change in the state of said detection signal, which in particular makes it possible to activate or deactivate a braking system or for example an emergency brake limitation solenoid valve.

Preferentially, said geometric configuration according to the invention is such that said pendulum includes, at another position of said pendulum intended to be opposite said detection system when said oscillation is equal to another threshold value, said interface between said two media. Advantageously, said position and said other position make it possible to define two threshold oscillation values, each being capable of triggering signaling, by said detector, of exceeding of said threshold value or said other threshold oscillation value, for example respectively for one direction of movement of the moving body and another direction of movement of said moving body.

In particular, said pendulum has a shape which is symmetrical with respect to a plane of symmetry passing through its center of gravity and the instantaneous center of rotation 0, said plane of symmetry being perpendicular to the plane of oscillation of said pendulum, said position and said other position being equidistant from said plane of symmetry, and the same medium extending from said first position to said second position. Said pendulum may for example be a flat pendulum or a three-dimensional pendulum. In particular, said pendulum is a flat body, and said same medium extending from said first position to said second position forms a window in the flat body.

Preferentially, said detection system includes a single detector and a single emitter, said geometric configuration advantageously allowing said detection system to signal the exceeding of said threshold oscillation value (intended for example to characterize a positive acceleration) and of said other threshold oscillation value (intended for example to characterize a negative acceleration).

Also, the measuring device according to the invention is in particular characterized in that it includes a brake intended to damp the pendulum when an oscillation exceeds said threshold value. Said brake includes for example a friction track intended to interact with a surface of said pendulum or at least one permanent magnet.

BRIEF DESCRIPTION OF THE SEVERAL VIEWS OF THE DRAWING

Examples of embodiments and applications provided using the following figures will help give a better understanding of the present invention. The reference numbers used in one figure are used correspondingly in the other figures.

FIG. 1 example of an embodiment according to the invention of a device for measuring acceleration which can be coupled to a vehicle (1A front view; 1B top view).

DESCRIPTION OF THE INVENTION

Figure 1A:
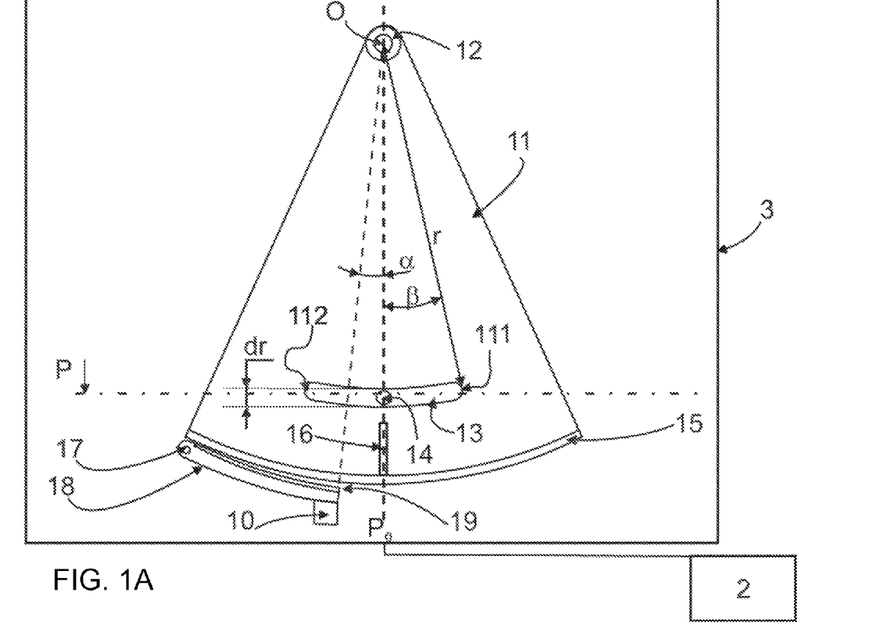
Figure 1B:
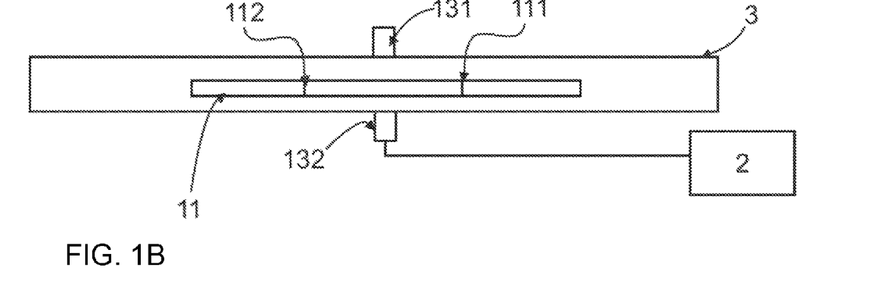
Figure 2:
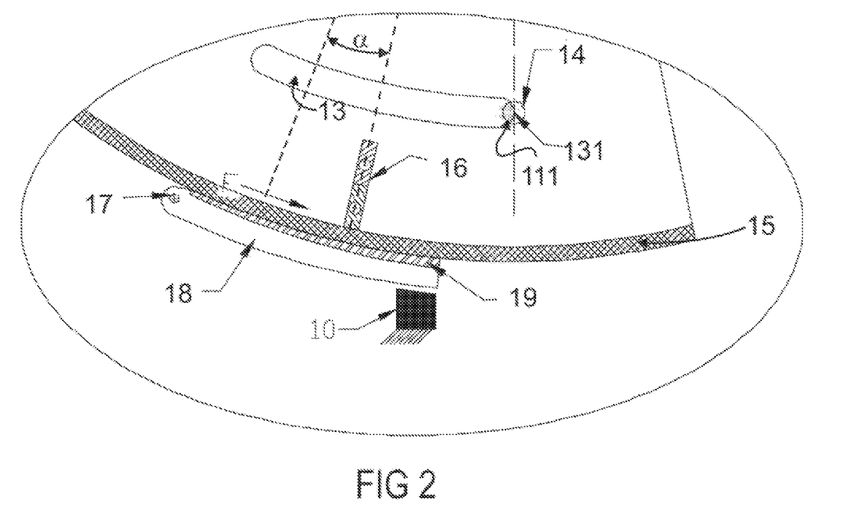
FIG. 2 example of an embodiment of a first geometric configuration of the pendulum according to the invention.

As an example, FIG. 1 shows a device 1 for measuring acceleration, said device 1 being intended to be fitted to a moving body in order to determine whether an acceleration of said moving body exceeds at least one threshold acceleration value. FIG. 1A presents a front view of said device 1, while FIG. 1B presents a top view of said device 1, along section P. Said measuring device 1 according to the invention includes:
  a pendulum 11 capable of oscillating about an instantaneous center of rotation 0, said pendulum 11 being able in particular to turn about a ball joint 12 capable of including said instantaneous center of rotation 0
  a detection system including in particular an emitter 131 and a detector 132, said detection system being capable of detecting an oscillation of said pendulum 11 likely to result from said acceleration
and being characterized in that
  the pendulum 11 has a geometric configuration allowing it to interact with said detection system, said geometric configuration being such that it allows said detection system, in particular said detector 132, to generate a detection signal capable of signaling solely an oscillation of said pendulum 11 exceeding or breaching a threshold value or, in other words, that said pendulum 11 is undergoing an acceleration exceeding a threshold acceleration value.

In particular, the device 1 may be coupled to a vehicle, by being for example fixed to a horizontal floor of said vehicle and connected to a braking system 2 of said vehicle. Preferentially, the detector 132 of the detection system may be directly connected to said braking system 2. Advantageously, the device 1 according to the invention makes it possible rapidly, safely and reliably to identify exceeding of a threshold value, in particular a predefined one, for the acceleration of said vehicle, whether it be a railway vehicle, metro/tram with iron or pneumatic wheels, and to limit said acceleration by transmitting said detection signal to said braking system 2. Said detection signal may for example be transmitted either directly in pneumatic, hydraulic or electrical networks of the vehicle or to a central braking control unit or to a general vehicle control unit, such as for example an automatic train control unit capable of managing said braking system.

Preferentially, said geometric configuration of said pendulum 11 is such that said pendulum 11 includes, at a position 111 intended to be opposite said detector 132 when said oscillation is equal to said threshold oscillation value, an interface between two media, respectively a first medium and a second medium, only one of the two media being capable of interacting with said detection system in order that said detection signal only signals a breach of a threshold value for oscillation or, in other words, for acceleration. In particular, said pendulum includes, at another position 112 intended to be opposite said detector 132 when said oscillation is equal to another threshold value, said interface between said two media. For example, said first medium is formed by an opaque body constituting the body of the pendulum 2 and encircling a window 13 made in said body of said pendulum 11, and the second medium 2 is a gas which may occupy said window 13 and encircling the body of said pendulum 11, for example nitrogen filling said sealed protective casing 3 of said pendulum. Said window 13 extends in particular from said first position 111 to said other position 112. In this case, said emitter 131 is preferentially a device capable of emitting a light beam 14 capable of passing through said window to be detected by said detector 132 while the oscillation of said pendulum is below said threshold oscillation value, said opaque body being capable of stopping said light beam 14 when said oscillation of said pendulum is greater than or equal to said threshold oscillation value. Thus, the passage from said second medium to said first medium can only be detected by said detector 132 when an oscillation of said pendulum exceeds at least one threshold oscillation value.

Oscillation of said pendulum in particular refers to the rocking arm movement of said pendulum when the latter departs from a position of equilibrium at rest $P_0$, said movement being able to be characterized at any moment by an angle of inclination of said pendulum which can be expressed in degrees or radians and formed between a straight line passing through the instantaneous center of rotation and the center of gravity of said pendulum when the latter is at rest, and said same straight line when said pendulum is in movement (a movement at 1 degree of freedom is considered). Said angle of inclination thus characterizes the deviation of said pendulum from its position of equilibrium at rest. For each threshold acceleration value to be detected by said device 1, a threshold oscillation value which can be expressed in degrees or radians is calculated as a function of the physical characteristics of the pendulum: said threshold oscillation value is thus a limit angle of inclination, such as for example angle $\beta$, defining a particular deviation of said pendulum from its position of equilibrium. Exceeding the threshold oscillation value refers to the passage of an oscillation of said pendulum characterized by an angle of inclination with a value below, respectively above, said limit angle to an oscillation characterized by an angle of inclination with a value above, respectively below, said limit angle. Exceeding a threshold oscillation value thus refers to the breach by the pendulum of a limit angle of inclination.

The geometric configuration according to the invention itself in particular refers to a particular geometric shape of said pendulum and/or to an arrangement of an element of said pendulum at said position or at said other position, said shape and/or said element only allowing said detection system to detect an oscillation exceeding said threshold oscillation value. The particular geometric shape or said element may for example be said window made in the body of said pendulum and with dimensions and position as a function of said position and/or of said other position only allowing the detection of an oscillation exceeding said threshold oscillation value and/or said other threshold oscillation value.

Preferentially, said device 1 according to the invention includes a friction track 15 and a magnet 16 in a fixed position in the body of said pendulum 11, said friction track 15 and said magnet 16 being intended to interact with a brake 18 moving about a ball joint 17, said ball joint of the brake 18 being in particular fixed to the same base as the ball joint 12 of the pendulum 11 and said brake 18 being capable of resting on a support 10 and of including a friction track 19 opposite the friction track 15 of said pendulum 11. In particular, said brake 18 is made of a metallic material and said magnet 16 is capable of exerting on said brake 18 a magnetic force capable of bringing said brake 18, in particular its friction track 19, into contact with the friction track 15 of said pendulum 11.

According to a preferential embodiment, said pendulum 11 is for example a flat pendulum, made from an opaque material, in the shape of a sector of a circle, which can be enclosed in said casing 3 which can be fixed to a moving body and providing for an oscillation of said pendulum about a ball joint 12 positioned at the top of said sector of a circle and including the instantaneous center of rotation O, said pendulum 11 also including a friction track 15 arranged at the end of said sector of a circle, along its arc, opposite the brake 18, and a magnet 16 positioned in the extension of a straight line passing through the center of gravity of said sector of a circle and the instantaneous center of rotation O, in the proximity of said friction track, said magnet 16 being capable of interacting magnetically with said brake 18 when said pendulum deviates by an angle $\alpha$ from its position of equilibrium $P_0$. The magnetic interaction between said brake 18 and said magnet 16 allows in particular the friction track 19 of said brake 18 to be brought into contact with the friction track 15 of said pendulum 11 when said pendulum deviates at least by said angle $\alpha$ from said position of equilibrium $P_0$. Preferentially, said pendulum 11 also includes a window 13, i.e. an aperture made in the body of said pendulum 11, said window being occupied by a gas included in said casing 3 (for example air or a neutral gas), said window also being symmetrical with respect to said straight line passing through said center of gravity and said instantaneous center of rotation O, extending the shape of an arc of a circle from a first position 111 to another position 112, each of said positions being situated at an equal distance r from said instantaneous center of rotation O, the length of the window, i.e. the length of the curve linking said position to said other position then being perceptibly equal to $2r\beta$, with $\beta$ expressed in radians, and the radial width of said window being equal to dr, dr being in particular greater than or equal to the size of the beam 14 at the level of said window, dr being for example equal to 2 mm.

Said angle $\alpha$ is in particular calculated as a function of a maximum slope of a track on which a moving body fitted with the device according to the invention is likely to move, so that said magnet 16 does not interact with said brake 18 when the moving body is moving at a constant speed or is in a resting position on the portion of said track with said maximum slope. In this way, start-up hysteresis is advantageously avoided: in fact, the angle $\alpha$ guarantees that the straight line passing through the center of gravity and the instantaneous center of rotation O of said pendulum 11 is aligned on the gravitational field when the speed of said moving body is constant or zero and not slightly inclined with respect to the gravitational field under the effect of a friction force resulting from contact between the friction track 15 of the pendulum 11 and the friction track 19 of the brake 18.

FIGS. 2 to 8 illustrate a use of the device according to the invention for a moving body in movement, said device according to the invention being intended to be fitted to said moving body, and making it possible rapidly, safely and reliably to identify and signal an exceeding of a level of acceleration of said moving body, and to limit said acceleration by directly controlling a braking system, either in a pneumatic, hydraulic, or electrical network, or by transmitting a detection signal to a braking control ("Braking Control Unit") or moving body control device, such as for example to an "Automatic Train Control" if said moving body is a train. The device proposed by the present invention is in particular capable of maintaining an acceleration below or equal to a threshold acceleration value of about $-2$ m/s$^2$, said threshold value being able in particular to be adjusted, for example by adjusting an opening of a window capable of allowing said beam to pass through (refer to FIG. 9 for more details). When said threshold value is reached, a contact is closed (or opened, depending on the logic of the device according to the invention) and a signal (analog or digital) is sent to said braking system responsible for regulating the braking of the moving body. FIGS. 2 to 8 describe the use of the device according to the invention in said moving body, making use of the same references as those used for FIG. 1 for each same object or for each equivalent object.

Let us assume that the device according to the invention as described in FIG. 1 is fixed in a moving body, so that the straight line passing through the instantaneous center of rotation O and the center of gravity of the pendulum is perpendicular to a horizontal plane on which said moving body is resting, while also being aligned with the gravitational field whether said moving body is at rest or moving at a constant speed on said horizontal plane.

While said moving body fitted with said device according to the invention is moving at constant speed on said horizontal plane, said straight line remains aligned with the gravitational field, i.e. perpendicular to said horizontal plane. In the event of deceleration of said moving body (see FIG. 2), a force due to said deceleration is exerted on the center of gravity of said pendulum, taking it away from its position of equilibrium by rotation about its instantaneous center of rotation O. When said deviation is equal to said angle α, the magnetic field of the magnet 16 is capable of pulling the brake 18 which is for example made of a metallic material. The friction tracks of the pendulum 15 and the brake 19 then come into contact with one another. The friction between the friction track 15 of the pendulum 11 and the friction track 19 of the brake 18 results in a tangential force F opposed to the direction of movement of said pendulum 11. The physical and geometric characteristics of the friction tracks are selected so that the force F is not sufficient to stop the rotational movement of the pendulum (for more details, refer to FIG. 3). The pendulum will thus continue to turn until an edge of its window 13, said edge being positioned on said pendulum 11 at position 111, obscures the beam 14. Advantageously, any passage of a gaseous medium capable of transmitting said beam and occupying said window to a solid opaque medium constituting the body of said pendulum and capable of stopping said beam 14 and any passage of said solid medium to said gaseous medium can be detected by the detector 132 of the detection system according to the invention. Thus, the device according to the invention is capable of directly correlating the obscuring of the beam 14 by the solid body of said pendulum with a variation of said detection signal, said variation not requiring any electronic processing in order to signal to the braking system 2 that said threshold oscillation or acceleration value has been exceeded. For example, said detection signal directly provides for the closure of a braking limitation solenoid valve capable of stopping the increase in said braking when it is closed. As long as the deceleration of said moving body is greater than the pre-established threshold acceleration value, said beam 14 will be obscured by the body of said pendulum 11, and the detector 132 will transmit a detection signal correlated to this exceeding of the acceleration threshold. When the deceleration decreases, the force resulting from said deceleration exerted on the center of gravity of said pendulum 11, decreases proportionally, allowing the pendulum to make a movement tending to make it regain its position of equilibrium. When the acceleration has reached a value below said acceleration threshold, the window 13 of said pendulum is opposite said beam 14 which may be detected by the detector 132 which is for example capable of directly controlling the closure of the braking limitation solenoid valve. Preferentially, a second brake identical to said brake 18 may be arranged symmetrically to said brake 18 with respect to a straight line passing through said instantaneous center of rotation O and the center of gravity of said pendulum when the latter is at rest, in order in particular to provide for the detection of said exceeding of a threshold oscillation value in two directions of movement of said moving body.

Figure 3:
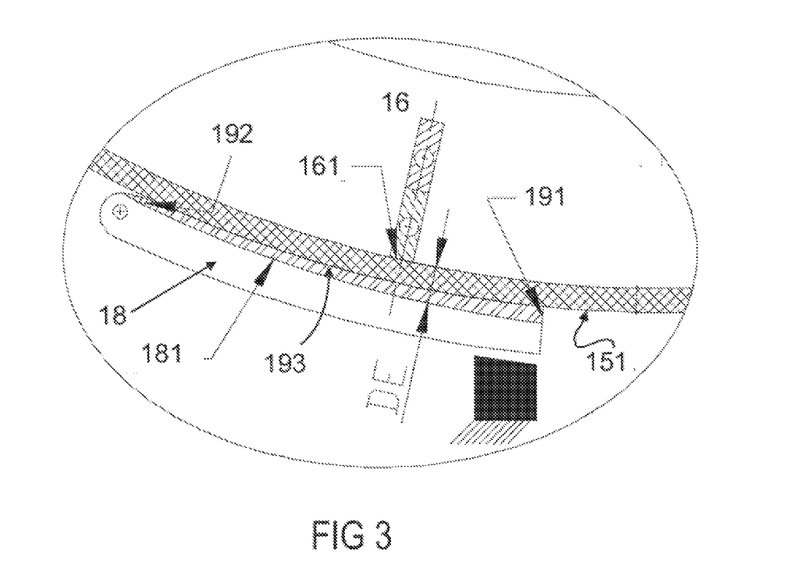
FIG. 3 example of an embodiment according to the invention of a brake of the device according to the invention.

FIG. 3 presents a more detailed view of the friction track 15 of the pendulum 11 and the friction track 19 of the brake 18. The tangential force F resulting from the contact between the two friction tracks is essentially intended to damp a pendular movement of said pendulum likely to provoke a sequence of oscillations when the beam 14 is obscured. Said tangential force F is equal to the coefficient of friction of the friction track 15 of the pendulum 11 against the friction track 19 of the brake 18, multiplied by the force of contact of said friction tracks 15, 19. This force of contact can be calculated as a function of the physical characteristics of the magnet 16 and the brake 18, i.e. the volume of the magnet 16, its exposed surface 161, its magnetic field; the volume and the exposed surface 181 of a metallic part of the brake 18; and finally the distance between the exposed surface 161 of the magnet 16 and the exposed surface 181 of the brake 18. Advantageously, the friction tracks 15, 19 of the pendulum 11 and the brake 18 are made of non-ferromagnetic materials such as for example stainless steel or ceramics, so as to avoid their magnetization.

Preferentially, the distance DE between the exposed surface 161 of the magnet 16 and the exposed surface 181 of the metallic (ferromagnetic) part of the brake 18 varies, in particular decreases, with an increase in the angle characterizing the deviation of said pendulum from its position of equilibrium. For this purpose, said brake 18 has for example the shape of a curved rod capable of taking on the curvature of the arc of a pendulum in the shape of a sector of a circle, the end 192 of said brake 18 which is furthest from the center of gravity of said pendulum 11 being held by a ball joint 17 allowing free rotation of said brake 18, and the other end 191 of said brake 18 being free and capable of being supported by a support 10 guaranteeing a small distance between the exposed surface 181 of the metallic (ferromagnetic) part of the brake 18 and the exposed surface 161 of the magnet 16. In particular, said brake 18 is made of at least two materials: a non-ferromagnetic material forming a layer of variable thickness intended to form said friction track 19, and covering a metallic material intended to interact with said magnet 16. Preferentially, the thickness of said layer or, in other words, the thickness of the friction track 19 of brake 18 decreases continually from said other end 191 to said end 192 so that the force of interaction between the magnet 16 and the metallic part of said brake 18 increases when the pendulum 11 moves away from its position of equilibrium. The surface 151 of the friction track 15 of the pendulum 11 and the surface 193 of the friction track 19 of the brake 18 have in particular the same radius of curvature so as to maintain uniform contact and reduce localized friction and thus wear of said friction tracks. Finally, the part of said brake 18 close to the ball joint 17 is chamfered so as to guarantee that, in resting position (i.e. brake resting on the support 10), a deviation is maintained between the said two friction tracks 15, 19. Thus, the present invention proposes in particular control of the tangential force F by variation of the thickness of the friction track 19 of the brake 18. Advantageously, a thickness variation profile of said friction track 19 of said brake 18 may be deduced from measurements of real accelerations of a moving body and adapted in order best to filter accelerations approaching said acceleration threshold.

Quite clearly, the present invention is not restricted to the preferential embodiment described above and a person skilled in the art would in particular be able to adapt this preferential embodiment to different shapes of pendulums 11, different arrangements or shapes for the brake 18. In particular, different pendulum-detection system interactions may be envisaged as a function of the geometric configuration of said pendulum.

Figure 5:
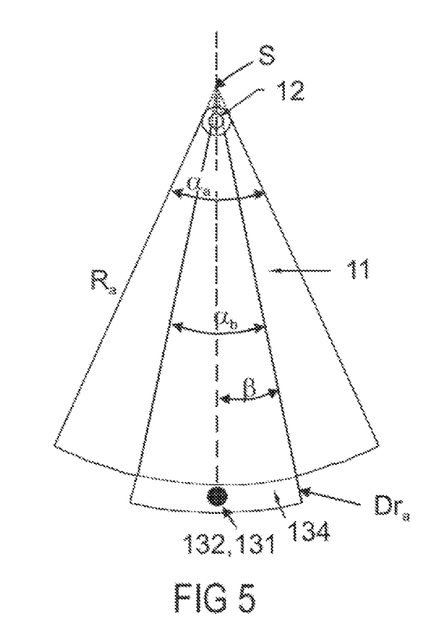
FIG. 5 example of an embodiment of another geometric configuration of the pendulum according to the invention.

In particular, according to a first particular embodiment of the device according to the invention, the detection system according to the invention includes an emitter capable of emitting a light beam intended to be detected by said detector, said emitter being positioned opposite said detector and fixed with respect to the latter, said pendulum 11 being capable of oscillating in a space separating said detector from said emitter. In this first embodiment, said pendulum has a geometric configuration providing for, according to a first variant, obscuring of said light beam 14 only when said pendulum deviates by said angle β from its position of equilibrium, said beam 14 thus being stopped by the body of said pendulum 11 before it reaches the detector 132 of the detection system (see FIG. 1 and FIG. 4: case of the pendulum including a window made in its body)

according to a second variant, free passage for said beam 14 of the emitter 131 as far as said detector 132 only when said pendulum deviates by said angle β from its position of equilibrium, said beam being stopped by the body of said pendulum 11 so long as the angle characterizing the deviation of said pendulum 11 from its position of equilibrium is less than said angle β (see FIG. 5). The body of said pendulum 11 is for example a flat body as presented in FIG. 5 the geometric shape of which is the result of a union in the mathematical sense of a first sector of a circle with vertex S, radius $R_a$ and angle to the vertex $\alpha_a$, with a second sector of a circle with the same vertex S, radius $R_a+Dr_a$, $Dr_a>0$ and scaled to obscure said beam 14, and with angle to the vertex $a_b \leq a_a$, with angle $\alpha_b=2\beta$, the center of gravity of the sector of a circle with angle to the vertex $\alpha_a$ and the center of gravity of the sector of a circle with angle to the vertex $\alpha_b$ being positioned on a single segment of a straight line originating from said vertex S (the sectors of a circle are assumed to have a homogeneous mass).

According to this first particular embodiment, said emitter 131 is for example an LED (Light Emitting Diode), and the detector 132 may be a photoelectric proximity detector capable of reacting to a variation in quantity of light received. For the first variant, it is the passage of a medium capable of transmitting said beam 14 to a medium capable of stopping said beam 14 when the deviation of said pendulum 11 from its position of equilibrium is equal to the angle β which allows for the detection of exceeding an acceleration threshold, and conversely for said second variant. Advantageously, the embodiment of the present invention according to the first variant of said first particular embodiment makes it possible to increase the safety of the detection system. In fact, in this case, a failure of the emitter 131 may be interpreted by the detection system as an exceeding of an acceleration threshold, while the braking system of the moving body will not be active. Such a failure may henceforth be easily detected and repaired.

Figure 4:
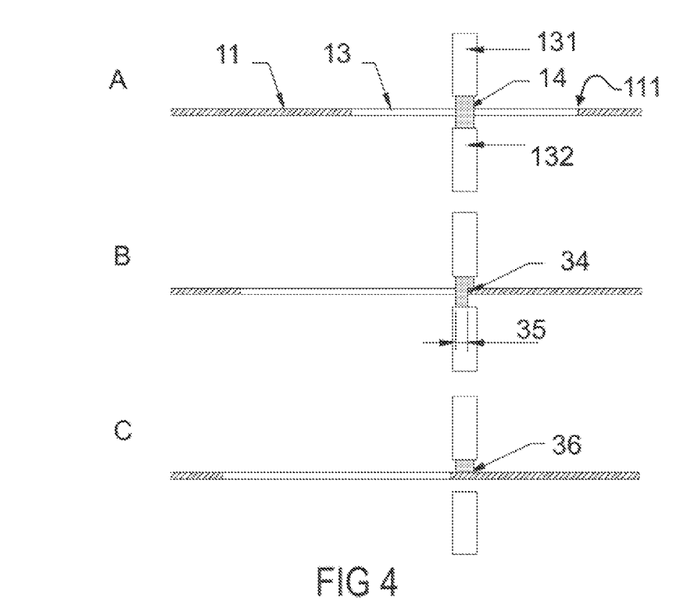
FIG. 4 illustration of the operation of a detection system according to the invention.

FIG. 4 presents in detail the operation of the device according to the invention in the case of the first variant according to said first particular embodiment. Whether it is a light beam 14 or, as we shall see later, an inductive/capacitive sensor (see FIGS. 5 and 6), the exact moment of change of state of the detection signal produced in particular during the passage of an edge of the window 13 (said edge being situated at position 111) in front of said detector 132, or respectively during passage from an electrically conducting medium to an electrically non-conducting medium in front of said detector 132 (the interface between said media being situated at said position 111) is advantageously taken into account by the present invention in order to avoid any effect of hysteresis between the change in state (e.g. 0-1 and 1-0) of the detection signal. For example, FIG. 4A illustrates the present invention in the case where the beam 14 is not obscured by the body of the pendulum 11 and thus freely passes through the window 13 opened in said body of the pendulum 11. FIG. 4B presents the case where the beam 14 is partially obscured, so that a partial beam 34 with diameter and thus intensity less than said beam 14 is capable of reaching said detector 132. In this case, the partial beam 34 illuminates a surface 35 of a photodetector of the detector 132 less than the surface which can be illuminated by the beam 14 when the latter is not obscured. The present invention preferentially includes an adjustment of a detection threshold, i.e. a light intensity threshold capable of being detected by the detector 132, so that the change in state of said detection signal takes place between the start of partial obscuring of the beam 14 and its total obscuring as presented in FIG. 4C. During the total obscuring of the beam 14, the latter illuminates a surface 36 of the body of the pendulum 11.

According to a second particular embodiment of the device according to the invention which can be illustrated by FIG. 5, said detection system is an inductive proximity detector including an emitter 131 capable of generating and emitting a magnetic field capable of interacting with an electrically conducting object or capable of interacting with a magnetic field and a detector 132 capable of detecting a variation of said magnetic field resulting in particular from the interaction of said magnetic field with said object. According to this second particular embodiment, said detector 132 is capable of generating a detection signal whose value, or preferentially state, depends on the presence of said object and its interaction with said magnetic field of said emitter 131. Preferentially, the body of said pendulum includes said object and the position of said object in the body of said pendulum allows the detector 132 correlatively to detect oscillations of said pendulum exceeding a threshold value. Thus, in this second particular embodiment, the geometric configuration of the pendulum provides for passage from a medium which is electrically conducting or generally capable of interacting with the magnetic field (the physical element or elements constituting said object form said medium which is electrically conducting or generally capable of interacting with the magnetic field) to a medium which is not electrically conducting or is generally incapable of interacting with said magnetic field only when an oscillation of said pendulum exceeds said threshold oscillation value, automatically provoking a change in the value, or preferentially the state, of said detection signal.

Figure 6:
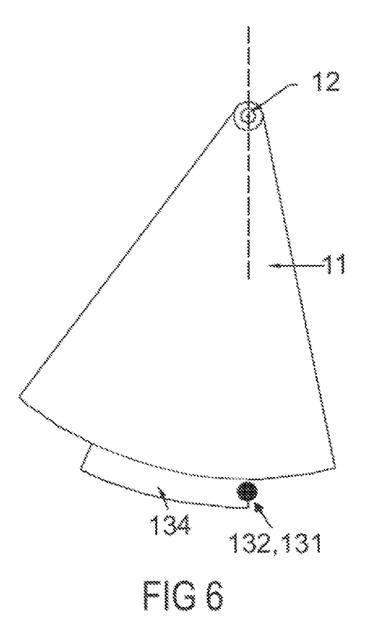
FIG. 6 illustration of detection of exceeding an oscillation threshold for said other geometric configuration of the pendulum according to the invention.

For this second particular embodiment and according to a first variant, the body of said pendulum may in particular have the geometric form described in FIG. 5, said object 5 occupying a surface 134 of said second sector of a circle, said surface 134 being made up of all of the points of said second sector of a circle situated at a distance $R_x \geq R_a$ from said vertex S. Said surface 134 thus has a shape of a sector of a circular crown, so the length is perceptibly equal to $(R_a+Dr_a)\cdot\beta$. When a moving body fitted with said device produced according to said second particular mode presented above is moving at a constant speed, the detector 132 detects the presence of the surface 134 and generates a detection signal characterized by a first value. During braking of the moving body fitted with said device according to the invention, the pendulum 11 pivots about its ball joint 12 as illustrated in FIG. 6. If the deceleration of said moving body exceeds a threshold value, the surface 134 leaves the field of detection of the detector 132 and provokes the generation of a detection signal characterized by a second value, said second value being capable of triggering a diminution of the braking of said vehicle. According to a second variant, the body of said pendulum could have the geometric form described in FIG. 1, said object being seated in the body of said pendulum on each side of said window in the extension along the length of said window, while retaining the same curvature and the same radial width dr as said window.

According to a third particular embodiment of the device according to the invention, the detection system is a capacitive proximity detector including an emitter 131 capable of emitting an alternating electrical field and a detector 132 capable of detecting a variation of a capacity of a capacitor of said detection system, said variation being capable of resulting from the interaction of said alternating electrical field with at least one part of the body of said pendulum 11. For this purpose, the body of said pendulum has, in particular and according to a first variant, the geometric form as described in FIG. 1 and, according to a second variant, the geometric form described in FIG. 5. The operating principle of the device according to the invention according to this third particular embodiment is preferentially similar, or identical, to the operating principle of the device according to the second particular embodiment, said detector 132 being capable of detecting any object interacting with said alternating electrical field emitted by said emitter 131, said interaction resulting in said variation from the capacity of said capacitor of said capacitive proximity detection system.

Figure 7:
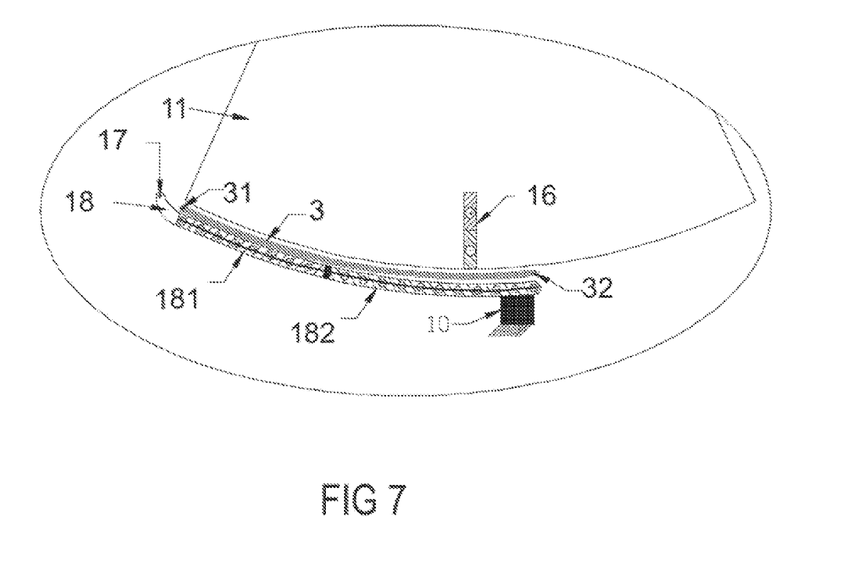
FIG. 7 example of an embodiment according to the invention of a brake including a permanent magnet and interaction of said brake with the pendulum at rest.
Figure 8:
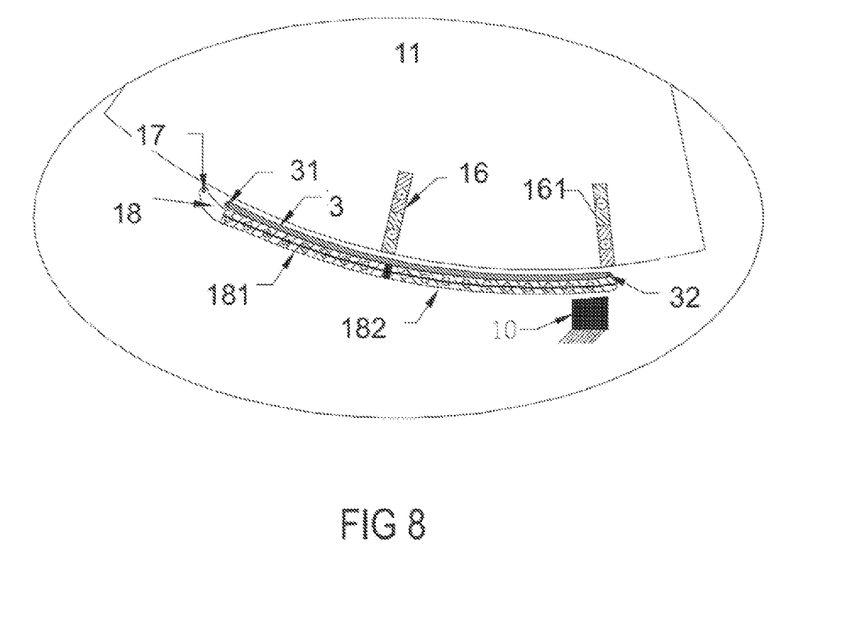
FIG. 8 example of an embodiment according to the invention of a brake including a permanent magnet and interaction of said brake with the pendulum in movement.

FIGS. 7 and 8 present a fourth particular embodiment of the device according to the invention, in which the body of said pendulum 11 includes at least one magnet 16 (or in particular two magnets 16, 161) capable of interacting with a brake 18 which can move about a ball joint 17, said brake 18 being configured to be repelled by the magnetic field of said magnet 16 when said pendulum is at rest (FIG. 7) and to be attracted by said magnetic field of said magnet 16 only when an oscillation of said pendulum exceeds a threshold oscillation value (cf. FIG. 8), the attraction of said brake 18 by the magnetic field of said magnet 16 being capable of provoking an electrical contact between the friction track 19 of said brake 18 and the friction track 15 of said pendulum 11 (see FIG. 2 or 3, said friction tracks 15, 19 being conductive in this fourth particular embodiment) or, according to a preferential variant, between said brake and a curved metal rod 3 arranged in particular between said brake 18 and the body of said pendulum 11 (see FIGS. 7 and 8), said electrical contact being capable of closing an electrical circuit connected to a braking system, activating for example a braking limitation solenoid valve. According to this fourth particular embodiment, said brake 18 is thus a magnetic triggering switch capable of detecting an oscillation of the pendulum (thus acting as a detector) and of controlling an activation or deactivation of a braking system, for example capable of controlling a braking limitation solenoid valve as a function of exceeding of a threshold acceleration value. Advantageously, said brake 18 may interact magnetically with said pendulum, in particular so as to damp its movement. According to this fourth embodiment, said geometric configuration of the pendulum is such that said pendulum includes, at a position of said pendulum intended to be opposite said detection system, i.e. said brake, when said oscillation is equal to said threshold oscillation value, an interface between two media, respectively a first non-magnetic medium and a second magnetic medium capable of acting as a magnetic field emitter, only one of the two media (i.e. the magnetic medium) being capable of interacting with said detection system in order to generate a detection signal capable of signaling solely said exceeding of said threshold oscillation value.

Preferentially, the body of said pendulum 11 has the shape of a sector of a circle which can move about a ball joint 12 positioned at the vertex of said sector of a circle. Said magnet 16 may in particular be buried in said body of said pendulum 11 and positioned in the middle of the arc of said pendulum.

The brake 18 includes in particular two magnetized parts, respectively a first part 181 and a second part 182, said parts being arranged so that the orientation of the magnetic field of the first part is the converse of the orientation of the magnetic field of said second part. According to said preferential variant, said metal rod 3 is in particular a curved slender rod positioned beneath the arc of said pendulum 11, the shape of which is capable of assuming the shape of the arc of said pendulum while guaranteeing movement of said pendulum 11 free from contact with said metal rod 3. The latter is preferentially held fixed at its two ends 31, 32 by fixings allowing for electrical conduction. Beneath said metal rod 3, opposite the arc of said pendulum 11, movably held by said ball joint 17, is said brake 18 with length and curvature perceptibly identical to those of said metal rod 3.

Preferentially, when said pendulum 11 is at rest, said magnet 16 is opposite said second part 182, the orientation of the magnetic fields of said magnet 16 and of said second part 182 being opposed to one another in order that said magnet 16 and said second part 182 are mutually repellent. Said brake 18 is thus pushed against its support 10, leaving the friction tracks 15 and 19 free from contact (or according to said preferential variant of this fourth particular embodiment, said metal rod 3 and said brake 18 (cf. FIG. 7)), and then stopping any electrical conduction between said brake 18 and said pendulum 11 (or according to said preferential variant, between said brake 18 and said metal rod 3). The circuit is then open. Advantageously, said magnet 16 is positioned in the body of said pendulum 11 so that it is opposite said first part 181 when an oscillation exceeds said threshold oscillation value. In this case, when said magnet 16 faces said first part 181, their respective magnetic fields having the same orientation, said magnet 16 and said first part 181 are mutually attractive, giving rise to the rotation of said brake 18 about its ball joint 17 and contact between the friction tracks 15 and 19 (or according to the preferential variant, contact of said brake 18 with said metal rod 3 (see FIG. 8)), allowing for electrical conduction between said brake 18 and said pendulum 11 (or according to the preferential variant, between said brake 18 and said metal rod 3). The electrical circuit is then closed. Said electrical conduction between said brake 18 and said pendulum 11 (or according to the preferential variant, between said brake 18 and said metal rod 3) makes it possible for example to transmit a detection signal capable of activating said braking limitation solenoid valve, while an absence of contact between said brake 18 and said pendulum 11 (or according to the preferential variant, between said brake 18 and said metal rod 3) stops the transmission of said detection signal, and deactivates said braking limitation solenoid valve. Possibly, another magnet 161 could be used to increase the force of attraction between said brake 18 and said pendulum 11 when an oscillation of the latter exceeds a threshold oscillation value. For example, said other magnet 161 could have an orientation of the polarization of its magnetic field identical to the orientation of the polarization of said second part and be arranged in the body of said pendulum so as to face said second part 182 only when an oscillation of said pendulum 11 exceeds said threshold oscillation value, the force of attraction between said other magnet 161 and said second part 161 being negligible when said pendulum 11 is at rest.

According to a first embodiment of the preferential variant of the fourth particular embodiment, the poles of the magnet 16, and of the magnet 161 if several magnets are used, are inverted so that the orientation of the polarization produced by said magnet 16 attracts said brake 18 when the pendulum is at rest and repels said brake 18 when an oscillation of said pendulum exceeds a threshold oscillation value. According to a second other variant of the fourth particular embodiment, the metal contact 3 is firmly attached to the arc of said pendulum 11, covering all of the length of said arc.

Figure 9A:
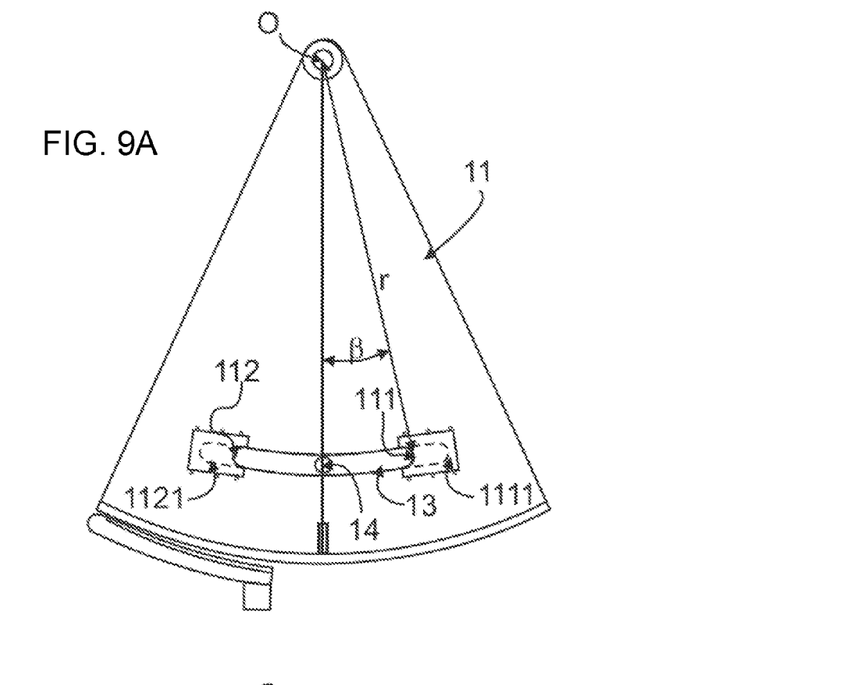
FIGS. 9A and 9B examples of embodiments of the device according to the invention providing for adjustment of an acceleration threshold intended to be detected by the device according to the invention.
Figure 9B:
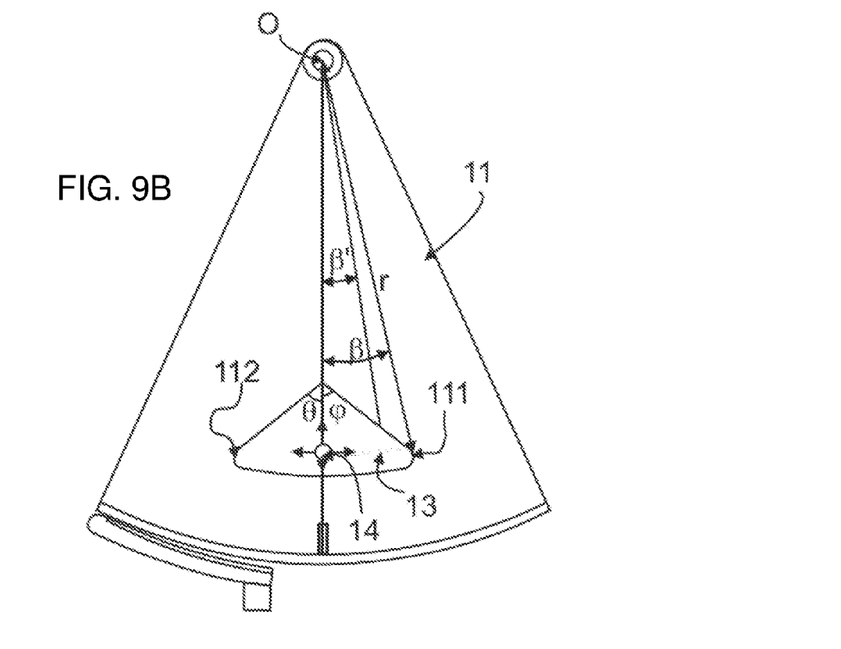

FIG. 9A and FIG. 9B present two non-restrictive examples of embodiment of the device according to the invention providing for adjustment of a threshold acceleration value. Generally, the device for measuring the acceleration of the moving body according to the invention preferentially includes a system for adjusting the threshold oscillation value which can be detected by said detection system. The first example (FIG. 9A) presents a pendulum 11 comprising a window 13 the length of which (i.e. the distance between the position 111 and the other position 112) may be varied by means of said adjustment system, which is for example in this case, a sliding window system comprising at least one sliding window, preferentially a first sliding window 1111 intended to modify the location of the position 111 with respect to the body of the pendulum and a second sliding window 1121 intended to modify said other position 112 with respect to the body of the pendulum. By modifying the location of said position 111 and/or 112 by means of said sliding windows 1111, 1121, the angle β varies and consequently the threshold acceleration value which can be detected by the detection system may be modified.

FIG. 9B shows a second example of embodiment of said adjustment system providing for adjustment of the threshold acceleration value which can be detected by the device according to the invention. In this case, the position of said detector may be modified by said adjustment system, for example by a system of micrometric screws intended to move said detector in a plane parallel to the plane of oscillation of the pendulum 11 in order to modify the position of detection by said detector of said passage of said first medium to said second medium when said oscillation is greater than or equal to said threshold value. Preferentially, said adjustment system is capable of moving said emitter and said detector together. For example, said system of micrometric screws includes two bases each capable of acting as a support for said emitter and respectively said detector, said bases being able to be moved together in order to move said detector and said emitter together. In particular, the body of said pendulum 11 includes a window 13 perceptibly triangular in shape, for example in the shape of an isosceles triangle, said window having a vertex positioned on the axis passing through the center of gravity of the pendulum at rest and the instantaneous center of rotation O and two rectilinear sides of which, starting from said vertex, form respectively an angle θ>β and φ>β, with said axis, in particular θ=φ in the case of said isosceles triangle, the third side of the window being curvilinear and in particular parallel to the arc of the pendulum when the latter has the shape of a sector of a circle. The emitter of the beam 14 and the detector may in particular be moved vertically by said adjustment device in order to vary the threshold acceleration value which can be detected by the detection system, the value of the angle β' formed by the intersection of said axis and the straight line passing through the instantaneous center of rotation O and the location of said position 111 (or respectively the location of said other position 112) varying continuously between 0° and β as a function of the vertical movement of the beam inside said window of perceptibly triangular shape, advantageously providing for continuous variation of the threshold acceleration value which can be detected by said detection system.

Figure 10:
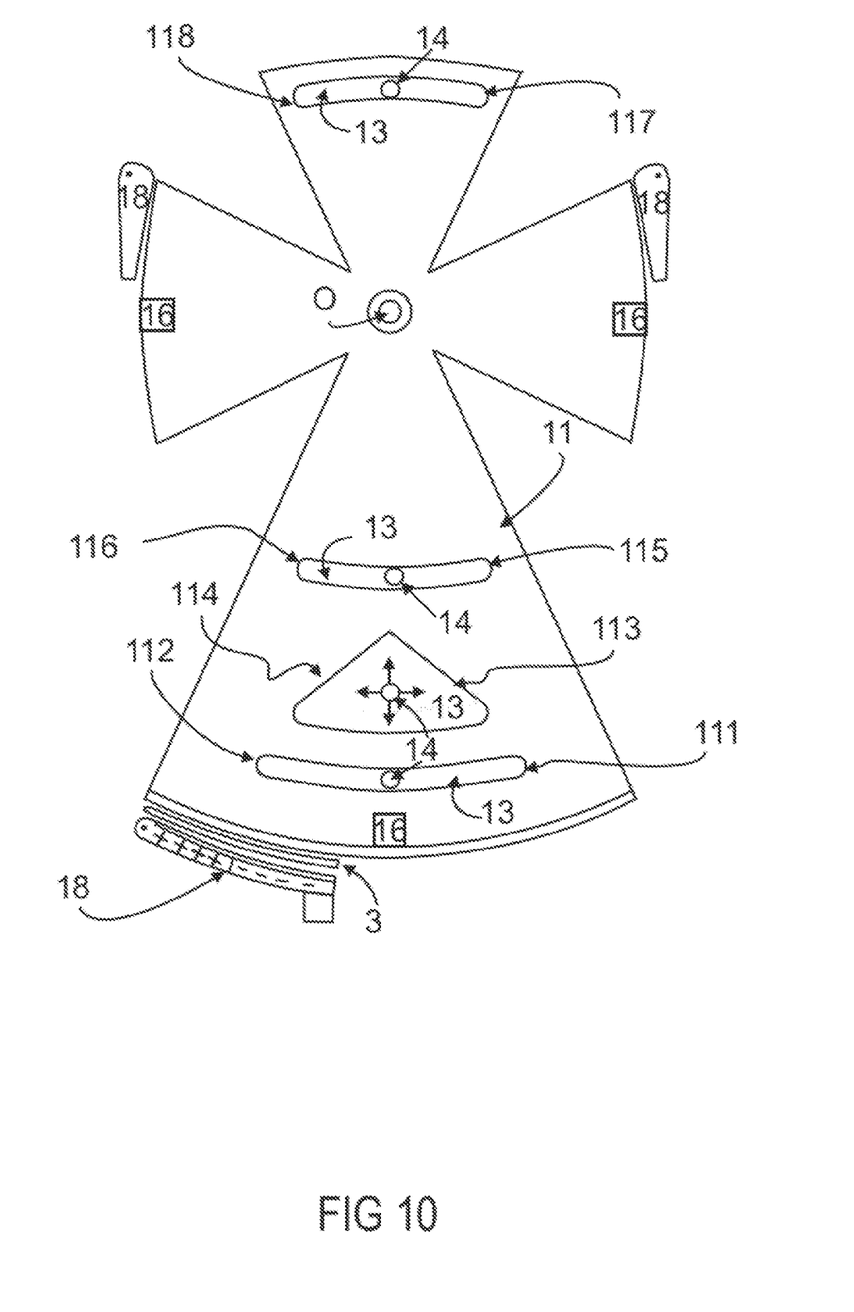
FIG. 10 example of an embodiment according to the invention of a device for measuring acceleration including redundant detection systems.

FIG. 10 presents an example of embodiment according to the invention of said device for measuring an acceleration including a backed-up detection system in that it includes several detectors each intended to detect a breach of a different threshold oscillation value or of a single threshold oscillation value. It may involve for example redundancy of detectors intended to detect said breach of said threshold oscillation value or different types of detectors (photoelectric, capacitive, inductive, by electrical contact), each intended to detect a breach of a different threshold oscillation value or of a single threshold oscillation value. Preferentially, said pendulum includes one or more windows 13 which could have the characteristics of the windows 13 described above (for example, a window of a perceptibly triangular shape, or a curved slender window) each intended to interact with a beam 14 emitted by an emitter and intended to be detected by a detector. Thus, the number of windows 13, the number of beams 14, the number of detectors and the number of emitters are equal in order that each window is capable of interacting with its own beam and its own detector. Each window is in particular capable of defining said first position 111, 113, 115, 117 and said other position 112, 114, 116, 118 according to the invention, each of said positions or other positions 111-118 being capable of providing for the detection of the same oscillation threshold and/or a different oscillation threshold. Each sector of a circle of said pendulum may in particular be damped by at least one brake 18 which can move about a ball joint, each brake 18 being intended to damp the pendulum 11 when an oscillation exceeds at least one threshold oscillation value. Each sector of a circle may in particular include one or more magnets 16 each intended to interact with at least one brake 18. Preferentially, at least one brake 18 is configured in order to be repelled by the magnetic field of at least one of said magnets 16 when said pendulum is at rest (see mechanism described in FIG. 7) and to be attracted by said magnetic field of said magnet 16 only when oscillation of said pendulum exceeds a threshold oscillation value (see mechanism described in FIG. 8), the attraction of said brake 18 by the magnetic field of said magnet 16 being capable of provoking an electrical contact between said brake 18 and a curved metal rod 3 arranged in particular between said brake 18 and the body of said pendulum 11, said electrical contact being capable of closing an electrical circuit connected to a braking system, activating for example a braking limitation solenoid valve.

Preferentially, said pendulum 11 is a flat pendulum in the shape of a cross comprising four arms, each of the arms of said cross making an angle of 90° with the adjacent arms and each arm being in the shape of a sector of a circle capable of including, at its circular end, a friction track as described above and intended to interact with a friction track of a brake 18 capable of interacting with it. Preferentially, three sectors of a circle are defined by a single radius R1 and a single angle at the vertex ω and are thus perceptibly equal in size and a fourth sector of a circle is defined by a radius R2>R1. Said sectors of a circle are thus linked together at their vertex in order to form said cross, the instantaneous center of rotation O being positioned at the intersection of said vertices of said sectors of a circle. Advantageously, the pendulum 11 as described in FIG. 10 makes it possible to detect breaches of different threshold oscillation values by means of different detectors and also makes it possible to detect the breach of the same threshold oscillation value by means of several detectors so that a failure of a detector and/or an emitter does not give rise to a false detection of a breach of a threshold oscillation value.

Finally, the present invention is not limited to the geometric configurations described in the present document, and a person skilled in the art would be able to adapt the shape of said pendulum, of said brake, and the position of said detection system as a function of their physical properties so that the measuring device according to the invention can signal a breach of a threshold acceleration value by a moving body fitted with said device.

Advantageously, the device according to the invention makes it possible at least to signal any acceleration which can be characterized by an acceleration vector perceptibly parallel to the plane of oscillation of said pendulum and perceptibly perpendicular to the straight line passing through the instantaneous center of rotation O and its center of gravity when the pendulum is at rest. Thus, the present invention makes it possible in particular to identify and signal an exceeding of a level of longitudinal acceleration (i.e. parallel to a path followed by the moving body) of a moving body in a simple way, avoiding the use of an electronic analysis system capable of failing, thus increasing the reliability of signaling of said exceeding.

To sum up, the device according to the invention presents several advantages with respect to the existing devices for measuring acceleration in that:

- the detection signal generated by the detection system of the device according to the invention may be used directly by braking solenoid valves, free from any conversion or electronic processing, digital or analog
- it takes account of the effects of slope on which a moving body fitted with said device according to the invention would be likely to move
- the damping of said pendulum by dry friction or magnetic field is not affected by the temperature of the system
- it also provides for backing up the detection of the exceeding of an acceleration value through the use of redundant detection systems (optical, inductive, capacitive, contact), hence increasing the reliability of the device
- they are intrinsically safe, since they are based on phenomena of acceleration and inertia
- they guarantee accurate and reproducible measurements of exceeding of a threshold acceleration value for said moving body: the accuracy and reproducibility of behavior are determined by the geometry of the device according to the invention, which is invariable in the temperature range envisaged (−40° C. to +70° C.)
- it allows a choice of materials which are easily recyclable and non-polluting for the environment
- it makes it possible to adjust the threshold acceleration value to be detected, for example 2m/s$^2$, guaranteeing a wide operating range
- it is simple in design, inexpensive, using few components, said components also retaining their physical properties over a long period of time
- a failure of said device does not necessarily give rise to emergency braking of the moving body to which it is fitted
- vibrations have negligible effect on said device according to the invention.

The invention claimed is:

1. A device for measuring an acceleration of a moving body, the device comprising:
   a pendulum configured to oscillate about an instantaneous center of rotation;
   a detection system configured to detect an oscillation of said pendulum resulting from the acceleration;
   said pendulum having a geometric configuration enabling said pendulum to interact with said detection system, and said geometric configuration configured to only allow said detection system to indicate an oscillation of said pendulum exceeding a threshold oscillation value; and
   a brake configured to damp said pendulum only when an oscillation exceeds said threshold oscillation value.

2. The measuring device according to claim 1, wherein said detection system includes a detector disposed perpendicular to a plane of oscillation of said pendulum.

3. The measuring device according to claim 1, wherein said detection system includes an emitter.

4. The measuring device according to claim 1, wherein said geometric configuration of said pendulum includes an interface between a first medium and a second medium at a position of said pendulum intended to be opposite said detection system when said oscillation is equal to said threshold oscillation value, and only one of said first and second media is capable of interacting with said detection system to indicate that said threshold oscillation value has been exceeded.

5. The measuring device according to claim 1, which further comprises a system configured to adjust said threshold oscillation value to be detected by said detection system.

6. The measuring device according to claim 2, wherein said detector is one of a plurality of detectors each configured to detect that a threshold oscillation value has been exceeded.

7. The measuring device according to claim 4, wherein said geometric configuration of said pendulum includes said interface between said first and second media at another position of said pendulum intended to be opposite said detection system when said oscillation is equal to another threshold value.

8. The measuring device according to claim 7, wherein said pendulum has a center of gravity and a symmetrical shape with respect to a plane of symmetry passing through said center of gravity and said instantaneous center of rotation, said plane of symmetry being perpendicular to a plane of oscillation of said pendulum, said position and said other position being equidistant from said plane of symmetry, and a single medium extending from said first position to said second position.

9. The measuring device according to claim 6, wherein said detection system includes a single detector and a single emitter, and said geometric configuration is configured to allow said detection system to indicate that said threshold oscillation value has been exceeded and another threshold oscillation value has been exceeded.

10. The measuring device according to claim 8, wherein said pendulum is a flat body, and said single medium extending from said first position to said second position forms a window in said flat body.

11. The measuring device according to claim 1, which further comprises a ball joint about which said brake is movable.

12. The measuring device according to claim 1, wherein said brake includes a friction track.

13. The measuring device according to claim 1, wherein said brake includes a permanent magnet.

14. The measuring device according to claim 13, wherein said brake is a magnetic trigger switch configured to detect an oscillation of said pendulum.

* * * * *